United States Patent [19]

Sudler

[11] 4,455,499
[45] Jun. 19, 1984

[54] TWO-PHASE STEPPING MOTOR

[75] Inventor: Roland Sudler, Frankfurt am Main, Fed. Rep. of Germany

[73] Assignee: VDO Adolf Schindling AG, Frankfurt am Main, Fed. Rep. of Germany

[21] Appl. No.: 424,716

[22] Filed: Sep. 27, 1982

[30] Foreign Application Priority Data

Dec. 17, 1981 [DE] Fed. Rep. of Germany ....... 3149943

[51] Int. Cl.³ .......................................... H02K 37/00
[52] U.S. Cl. ................................. 310/49 R; 310/156; 310/162
[58] Field of Search ....... 310/40 MM, 49 R, 162–164, 310/216, 156, 268, 258; 368/157, 160

[56] References Cited

U.S. PATENT DOCUMENTS

| 3,989,967 | 11/1976 | Kikuyama | 310/49 R |
| 4,048,548 | 9/1977 | Nakajima | 310/40 MM |
| 4,144,467 | 3/1979 | Nakajima | 310/40 MM |
| 4,206,375 | 6/1980 | Sudler | 310/163 |
| 4,267,472 | 5/1981 | Sudler et al. | 310/49 R |
| 4,361,790 | 11/1982 | Laesser et al. | 310/216 |

FOREIGN PATENT DOCUMENTS

| 2707252 | 8/1978 | Fed. Rep. of Germany .... 310/49 R |
| 2741310 | 3/1979 | Fed. Rep. of Germany .... 310/49 R |

Primary Examiner—R. Skudy
Attorney, Agent, or Firm—Martin A. Farber

[57] ABSTRACT

In a two-phase stepping motor having a rotor (1) with a disk-shaped axially magnetized permanent magnet (8) which has a plurality of poles of constant pole spacing, a first stator part (11) which bears an exciter winding (3) and has first stator poles (15) extending parallel to the face of the permanent magnet (8) and a second stator part (12) which bears an exciter winding (4) and has second stator poles (16) which extend parallel to the face of the permanent magnet (8), the two stator parts (11, 12) are arranged in a single plane, at least in the region of the stator poles (15, 16) and are connected with each other in said plane by intermediate pieces (13, 14) of small magnetic conductance. The first and second stator poles (15, 16) are each divided into two groups (17, 18; 20, 21) which are magnetically separated from each other, the one group (17, 20) being shifted by one rotor-pole spacing from the other group (18, 21). The two groups (17, 18) of first stator poles (15) are shifted from the two groups (20, 21) of second stator poles (16) by half a rotor-pole spacing. On that face of the permanent magnet (8) which faces away from the stator poles (15, 16) there is a return flux disk (9) for the induction fluxes coming from the exciter windings (3, 4).

8 Claims, 3 Drawing Figures

TWO-PHASE STEPPING MOTOR

TWO-PHASE STEPPING MOTOR

The present invention relates to a two-phase stepping motor having a rotor with a disk-shaped axially magnetized permanent magnet which has a number of poles of constant pole spacing, a first stator part which bears an exciter winding and has first stator poles extending parallel to the face of the permanent magnet and a second stator part which bears an exciter winding and has second stator poles extending parallel to the face of the permanent magnet.

A two-phase stepping motor of this type is already known (West Germany AS No. 25 38 372) in which the stator poles of a first stator part which bears an exciter winding are arranged parallel to one face of the permanent magnet and the stator poles of a second stator part which bears an exciter winding are arranged parallel to the other face of the permanent magnet. The permanent magnet is therefore located between the two stator parts which extend parallel to each other and through which the rotor shaft extends outwards. The two stator parts are connected with each other by non-magnetic spacer members, for instance of brass.

This known two-phase stepping motor, in the same way as other known two-phase or multi-phase stepping motors which contain a radially magnetized permanent-magnet rotor and stator poles directed against the periphery of the rotor, has the disadvantage that it is of relatively large structural volume and, due to its large number of structural parts and the highy precise assembly thereof is of a construction which is unfavorable for manufacture.

These disadvantages are to be overcome by the present invention. The object of the invention is, therefore, to provide a two-phase stepping motor which has the smallest possible structural volume and can be manufactured easily and cheaply.

Starting from a two-phase stepping motor of the type described above, this object is achieved in accordance with the invention in the manner that the two stator parts (11, 12) are arranged, at least in the region of the stator poles (15, 16) in the same plane and are connected with each other in this plane by intermediate pieces or constrictions (13, 14) which are of low magnetic conductance; that furthermore the first and second stator poles (15, 16) are subdivided in each case into two groups (17, 18; 20, 21) which are magnetically separated from each other, the one group being shifted by one rotor-pole spacing from the other; that, furthermore, the two groups (17, 18) of the first stator poles (15) are shifted with respect to the two groups (20, 21) of the second stator poles (16) by half a rotor-pole spacing; and that, finally, a return-flux disk (9) for the induction fluxes coming from the exciter windings (3, 4) is present on that face of the permanent magnet (8) which faces away from the stator poles (15, 16).

With such a construction of the motor the two stator parts can be produced as a single stamping from a ferromagnetic material, the two stator parts forming an integral unit which need merely be supplemented then by the bridge parts bearing the exciter windings in order to obtain a complete stator. In order to complete the entire motor, therefore, it is then necessary merely to insert the permanent-magnet rotor into the stator part or the support receiving the stator part. The logical arrangement of all stator poles on one side of the disk-shaped permanent magnet leads to an extremely flat construction of the motor so that the production of two-phase stepping motors of a height of less than 6 mm is readily possible. Thus such a motor is particularly suitable for wristwatches and other indicating instruments the structural height of which must be kept small for aesthetic or technical reasons. Furthermore, with such a construction the air gap between the stator poles and the permanently magnetized rotor can be reduced to an extremely small amount so that the efficiency and the energy consumption of such a motor are substantially more favorable than in the case of the known motors. Furthermore, eccentricity of the rotor with respect to the stator affects these values substantially less than in the case of the known motors. Another advantage of the motor of the invention is that, due to the integral construction of the entire stator, the expense for bearings can be considerably reduced which has a positive effect on the cost of manufacture.

In accordance with one advantageous embodiment of the invention, the return flux disk (9) and the permanent magnet (8) are attached to each other, secured against turning relative to each other. Such an embodiment is, in particular, provided if no special measures need be taken for the step damping of the motor whether due to the use of magnets of high coercive force or because over-shooting of the motor after each step can be permitted. The attachment of the return-flux disk and the permanent magnet to each other in a manner which prevents their turning relative to each other can advantageously be effected in the manner that the return flux disk (9) is pressed onto the rotor shaft (7) and the permanent magnet (8) is bonded onto the return flux disk (9). This has the advantage that the permanent magnet, which generally consists of a material from which highly precise parts can be produced only with difficulty, can be manufactured with relatively large tolerances and the precise centering of these parts on the return flux disk can be effected during the hardening of the bonding agent.

If, on the other hand, a stepping motor is desired in which noticeable over-shootings of the rotor after each step of the rotor are to be definitely avoided, it is advisable to mount the return flux disk (9) overhung on the rotor shaft (7). In this case the return flux disk is used additionally as inertial mass which is magnetically coupled to the rotor. This coupling has the result that at the end of each rotor step the return flux disk continues to turn while the rotor begins to turn back. The friction between the two parts which is produced by the magnetic coupling leads to a braking of the rotation of the parts and thus to the desired damping.

The invention will be explained in further detail with reference to the drawing, which shows—in part diagrammatically—a preferred embodiment and in which.

Figure 1:
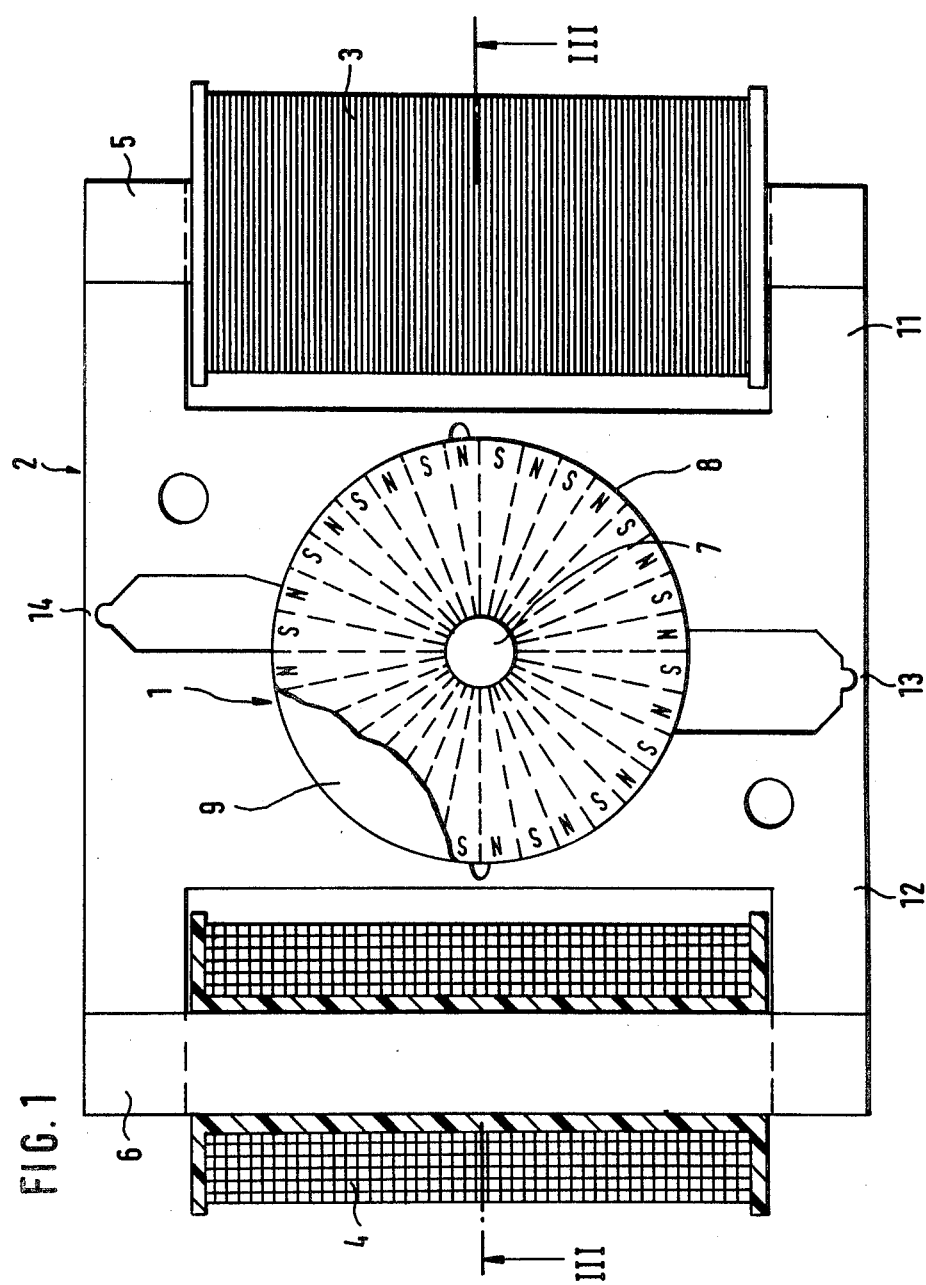
FIG. 1 is a view partially in section of a two-phase stepping motor.

The two-phase stepping motor comprises a rotor 1 as well as a stator 2 formed as a plate having two exciter coils 3 and 4 which are seated on respective bridge parts 5 and 6 which are welded to the stator part at the ends or extensions thereof extending out of the exciter windings 3 and 4.

The rotor 1 comprises a shaft 7 on which there is seated a permanent-magnet disk 8 which is axially magnetized and has 32 pairs of poles in its circumferential direction. As a result of the axial magnetization, therefore, a north pole on the one face of the rotor is opposite a south pole on the other face of the rotor. On that face of the permanent magnet disk (8) facing away from the stator 2 there is a return-flux disk 9 which is mounted overhung or suspended on the shaft 7 so that it can turn relative to the permanent-magnet disk 8. As material for the permanent magnet, use may be made of the preferred-direction barium ferrite which is sold under the brand name Korrox 330 (a trademark of Vlavo of West Germany) or of a samarium-cobalt alloy obtainable, for instance, under the brand name Vacomax 145 (a trademark of Vacuum-Schmelze of West Germany).

The shaft 7 of the rotor is mounted on one or both ends in a bearing 10, which bearing may also be arranged in the stator plane, as is especially the case if a particularly small structural height is to be obtained for the motor.

Figure 2:
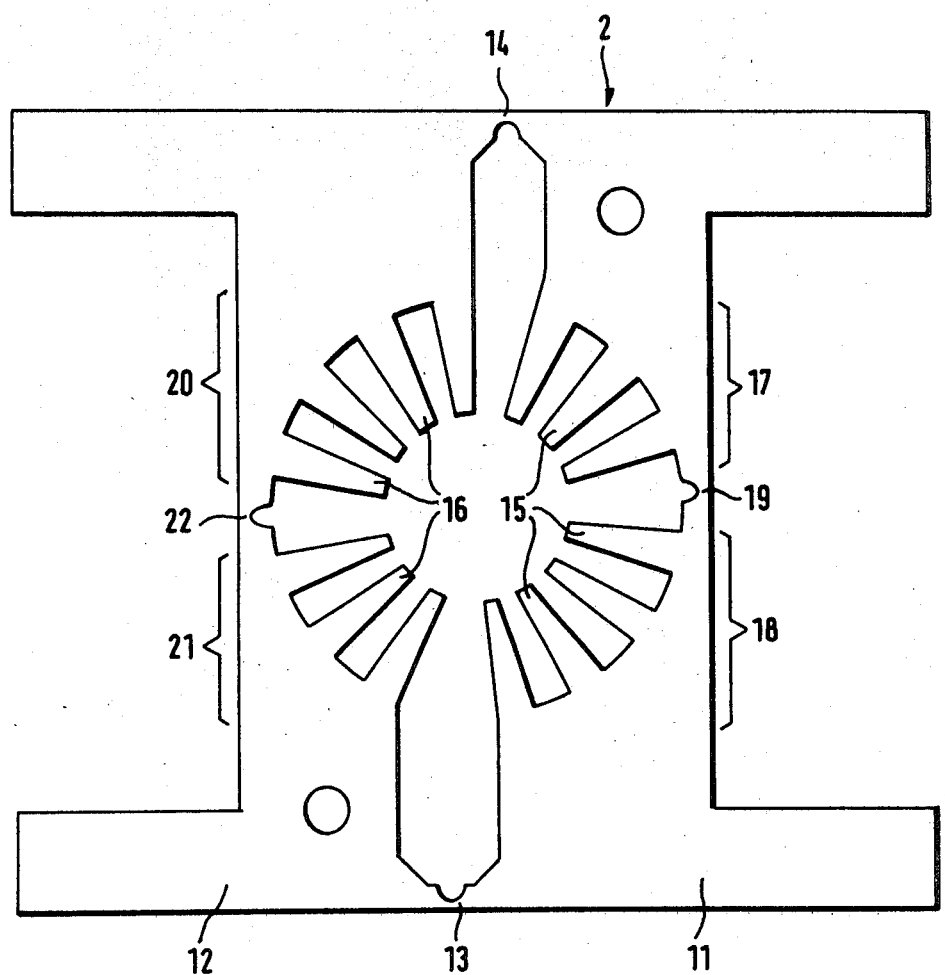
FIG. 2 is a top view of the integral stator part of the two-phase stepping motor of FIG. 1.
Figure 3:
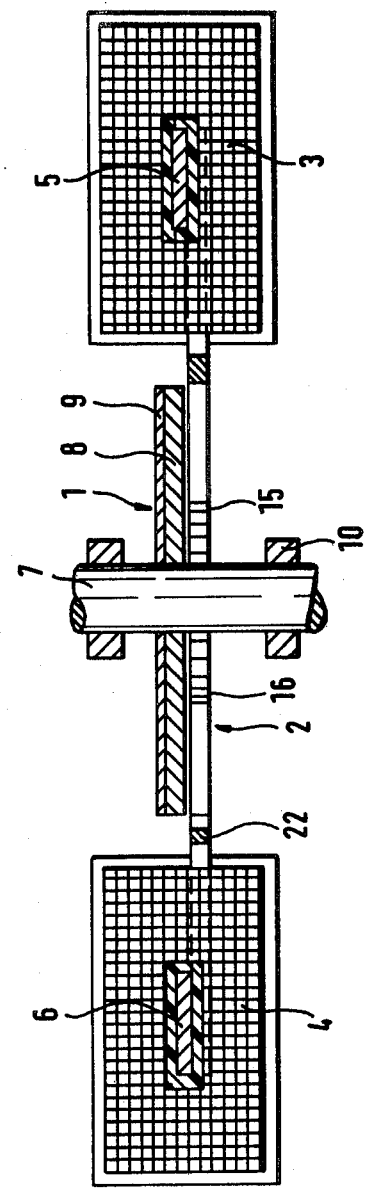
FIG. 3 is a section along the line III—III through the two-phase stepping motor of FIG. 1.

The stator of the two-phase stepping motor comprises—as can be noted in particular from FIG. 2—a first stator part 11 and a second stator part 12, these stator parts being connected with each other by two intermediate pieces or constrictions 13 and 14. The intermediate pieces or constrictions 13 and 14 are of very low magntic conductance d8ue to their small cross section so that the induction flux produced by the exciter windings 3 and 4 remains in the stator part 11 and 12 respectively and does not pass over to the adjacent stator part or does so only to a negligible extent.

Each of the two stator parts 11 and 12 is provided with salient stator poles 15 and 16 respectively which are directed in the form of fingers radially towards the shaft 7. The stator poles 15 are shifted from the stator poles 16 in each case by half a rotor pole spacing. Furthermore, the stator poles 15 are divided into two groups 17 and 18 which are connected to each other by an intermediate piece or constriction 19. The cross section of the intermediate piece constriction 19 is so dimensioned that when current flows through the exciter winding 3 the induction flux produced by it magnetically saturates the intermediate piece or constriction 19 so that the induction flux flows from the group 17 of the stator poles 15 via the return flux disk 9 to the group 18 of the stator poles 15 and cannot be closed directly via the stator part 11. The group 17 of the stator poles 15 is shifted from the group 18 of the stator poles 15 by one complete rotor pole spacing. The stator part 12 is also constructed in the same manner. It comprises two groups 20 and 21 of rotor poles 16 which are connected to each other by a magnetically saturatable intermediate piece or constriction 22. The constrictions divide the stator 2 with its poles into quadrants (not identified by reference numeral).

The stator 2 is stamped in a single piece from a material of low retentivity.

I claim:

1. In a two-phase stepping motor having a rotor with a disk-shaped axially magnetized permanent magnet which has a number of poles of constant pole spacing, a first stator part which bears an exciter winding and has first stator poles extending parallel to one face of the permanent magnet and a second stator part which bears an exciter winding and has second stator poles extending parallel to the face of the permanent magnet, the improvement wherein the two stator parts are arranged, at least in the region of the stator poles in the same plane and are connected with each other in this plane by intermediate pieces which are of low magnetic conductance, the first and second stator poles are subdivided in each case into two groups which are magnetically separated from each other, the one group being shifted by one rotor-pole spacing from the other, the two groups of the first stator poles are shifted with respect to the two groups of the second stator poles by half a rotor-pole spacing, and a return-flux disk for the induction fluxes coming from the exciter windings is present on a face of the permanent magnet which faces away from the stator poles.

2. The stepping motor as set forth in claim 1, wherein said return flux disk and the permanent magnet are connected rigidly with one another for joint rotation.

3. The stepping motor as set forth in claim 2, wherein said rotor includes a shaft, said return flux disk is pressed onto said rotor shaft and said permanent magnet is bonded onto the return flux disk.

4. The stepping motor as set forth in claim 1, wherein said rotor includes a shaft, and said return flux disk is overhung on the rotor shaft permitting rotation of said disk relative to said permanent magnet for frictional braking thereof.

5. A two-phase stepping motor comprising:

a plate of magnetizable material having a set of radially disposed stator poles formed therein, said plate further comprising a set of four constrictions formed therein for inhibiting the passage of magnetic flux between quadrants of the plate, first and second windings supported by extensions of said quadrants of said plate, a rotor of permanent magnets having poles arranged in a plane parallel to a plane of said plate and having a shaft rotatably coupled to said plate, the positions of the stator poles in one of said quadrants being offset relative to the positions of the poles in the opposite quadrant by a spacing of one half a pole of said rotor, and a return-flux disk positioned on said shaft, said permanent magnets being positioned between said disk and said set of stator poles.

6. The motor according to claim 5, wherein said disk is rigidly connected to the permanent magnets of said rotor.

7. The motor according to claim 5, wherein said disk is rotatably coupled by said shaft to said permanent magnets to provide a braking function to said rotor at the conclusion of an incremental rotation of said rotor relative to said set of stator poles.

8. The motor according to claim 5, 6 or 7, further comprising a single bearing for the rotatable coupling of said shaft to said plate whereby the thickness of said motor is minimized.

* * * * *

UNITED STATES PATENT AND TRADEMARK OFFICE
CERTIFICATE OF CORRECTION

PATENT NO. : 4,455,499
DATED : June 19, 1984
INVENTOR(S) : Roland Sudler

It is certified that error appears in the above—identified patent and that said Letters Patent are hereby corrected as shown below:

Column 4, Line 45, (Claim 5) after "the" (second occurrence) insert --stator--

Signed and Sealed this

Twenty-fourth Day of September 1985

[SEAL]

Attest:

DONALD J. QUIGG

Attesting Officer

*Commissioner of Patents and Trademarks—Designate*